(12) United States Patent
Childs

(10) Patent No.: US 7,123,182 B1
(45) Date of Patent: Oct. 17, 2006

(54) TIME SHARING JAMMERS

(75) Inventor: Michael Anthony Childs, Hampshire (GB)

(73) Assignee: BAE Systems Electronics Limited, Farnborough Hampshire (GB)

( * ) Notice: Subject to any disclaimer, the term of this patent is extended or adjusted under 35 U.S.C. 154(b) by 1826 days.

(21) Appl. No.: 07/075,699

(22) Filed: Jun. 24, 1987

(51) Int. Cl.
G01S 7/36 (2006.01)

(52) U.S. Cl. ......................................... 342/14
(58) Field of Classification Search ................. 342/13, 342/14; 455/1
See application file for complete search history.

(56) References Cited

U.S. PATENT DOCUMENTS

| | | | |
|---|---|---|---|
| 2,567,261 A | * | 9/1951 | Williams |
| 3,225,300 A | * | 12/1965 | Barney et al. ............... 455/1 X |
| 3,896,439 A | * | 7/1975 | Lester et al. |
| 3,955,200 A | * | 5/1976 | Miller |
| 4,040,054 A | * | 8/1977 | Overman |
| 4,595,902 A | * | 6/1986 | Proske et al. ............... 455/1 X |
| 4,743,905 A | * | 5/1988 | Wiegand |

* cited by examiner

Primary Examiner—Mark Hellner
(74) Attorney, Agent, or Firm—Jacobson Holman PLLC

(57) ABSTRACT

A time sharing jammer comprises two sources of jamming signals 1 and a switch 4 for coupling the sources of jamming signals to a microwave power amplifier 6, such as a travelling wave tube. A pseudo random code generator 8 is provided which is arranged to cause operation of the switch 4 whereby the sources of jamming signals 2 are coupled to the power amplifier 6 in accordance with the pseudo random code.

5 Claims, 4 Drawing Sheets

TIME SHARING JAMMERS

The present invention relates to improvements in or relating to time sharing jammers such as multiple threat jammers.

Jammers, including multiple threat jammers, usually operating at microwave frequencies are effective to block a potential threat by transmitting narrowband spot noise. One type of known multiple threat jammer shares a microwave power amplifier, such as a travelling wave tube, between two or more sources of jamming signals. However, one disadvantage of both sources simultaneously using the power amplifier is that each jamming signal is limited to less than one quarter of the amplifier's power capability and furthermore, the sources are highly prone to the capture effect in the travelling wave tube. Typically a multiple threat jammer can achieve transmission of a plurality of jamming signals through time sharing the power amplifier, and previously, time sharing means have included a squarewave switching waveform to achieve the time sharing function. However, since the characteristic of such a switching waveform is periodic and predetermined then it is likely that an electronic counter—counter measure (ECCM) system can determine the clock rate of the switching waveform and use a blanking technique to negate the jamming signals.

Another known multiple threat jammer operates at ultrasonic frequencies by randomly switching between transmission of wideband noise signal and narrowband signal.

The wideband noise signal is effective to mask passive sonar signals, whilst the narrowband signal aims to negate an active sonar signal. Random switching maybe achieved by a free-running multivibrator alternating the source of signals to be transmitted either wideband noise signal or narrowband signal.

However, such a multiple threat jammer has the disadvantage that any one source of signals maybe coupled to the amplifier for a relatively long period of time, thus reducing the effectiveness of jamming any one particular active signal whilst increasing the possibility of detection by an ECCM.

It is an aim of the present invention to provide a time sharing jammer, in which the above disadvantages are alleviated.

According to the present invention, there is provided a time sharing jammer comprising first and further sources of jamming signals, switching means coupled to the first and further sources of jamming signals, and coupled to amplifier means for affording the jamming signals to amplifier means, and a pseudo random code generator for generating a pseudo random bi-phase code arranged to cause operation of the switching means in accordance with the pseudo random bi-phase code, the pseudo random code generator incorporating a clock pulse generator of a given period, whereby any source of jamming signals is not coupled continuously to the amplifier means for longer than the period of the clock pulse generator.

The pseudo random bi-phase code preferably comprises Manchester code.

The pseudo random code generator may comprise of a read only memory (ROM) preferably including a parallel serial converter for reducing the address change rate required of the ROM.

The time sharing jammer may also comprise of at least two switching means for coupling the sources of jamming signals to at least two amplifier means and two or more pseudo random bi-phase code generators arranged to cause operation of the switching means associated with that generator, such that the period and the pseudo random bi-phase code for any pseudo random code generator is independant of the period and the pseudo random code for each of the other pseudo random code generators.

The present invention will now be described, by way of example, with reference to the accompanying drawings in which.

Figure 1:
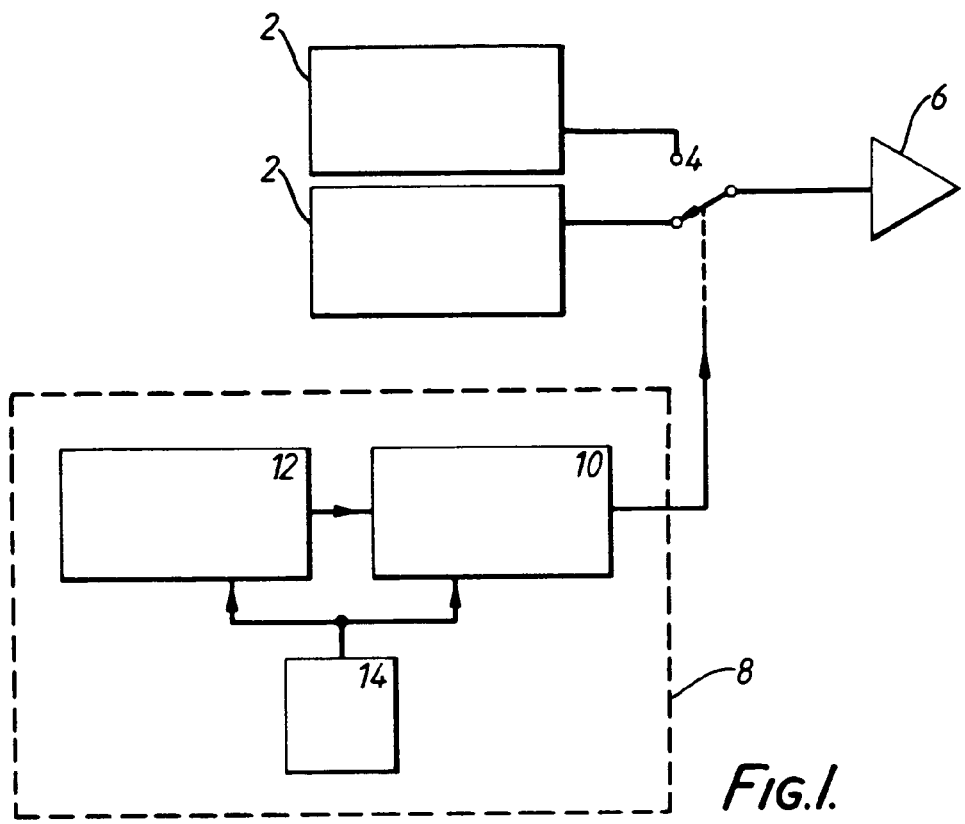
FIG. 1 is a generally schematic block diagram of a time sharing jammer according to one embodiment of the present invention.

Referring to FIG. 1, there is shown a time sharing jammer comprising of two sources of jamming signals 2, switching means, such as a switch 4, coupled to the sources 2 for affording the jamming signals to an amplifier means such as a travelling wave tube (TWT) 6, and a pseudo random code generator 8, for producing a pseudo random code, coupled to the switch 4.

Figure 2:
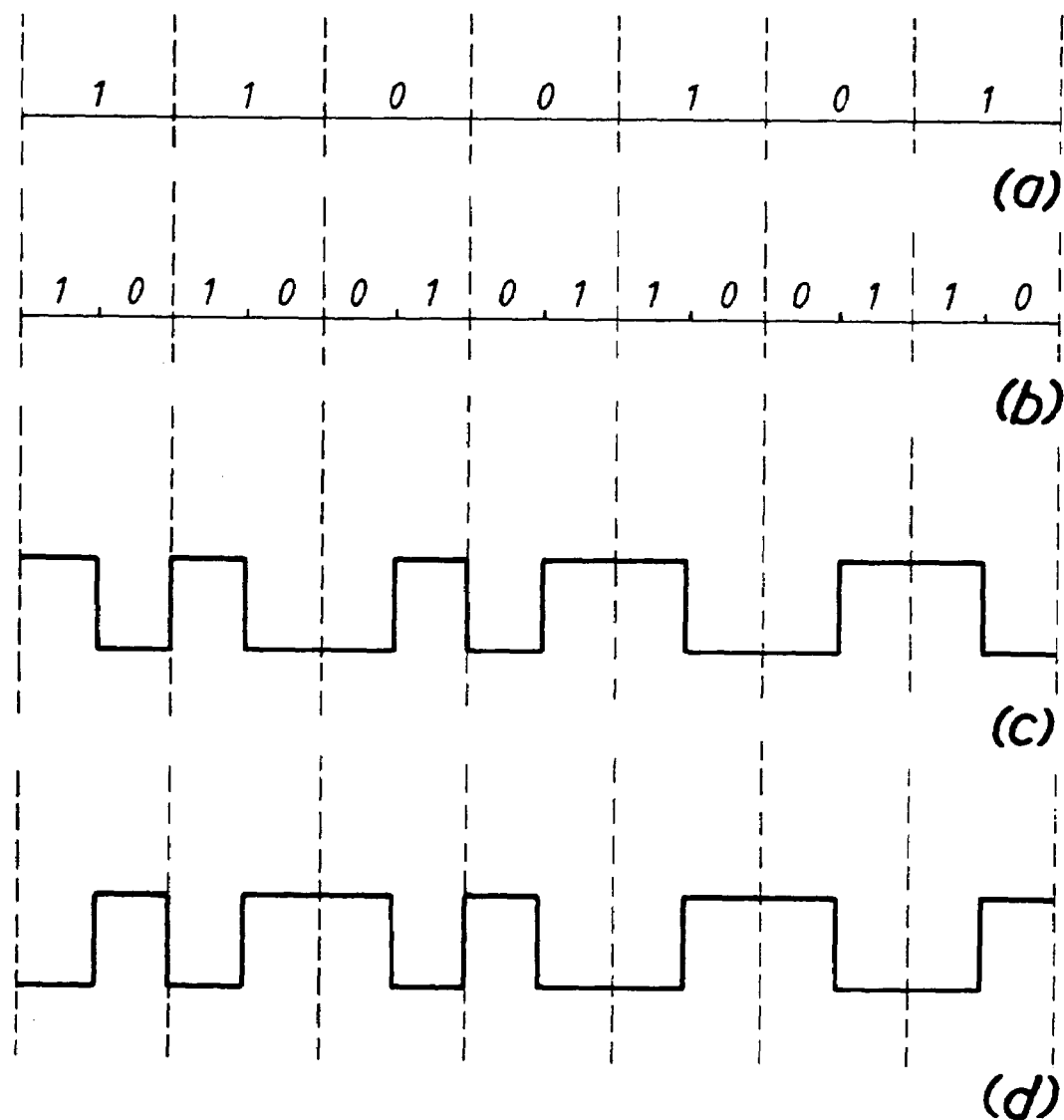
FIG. 2 is a diagram illustrating operation of a pseudo random code generator for use in the time sharing jammer shown in FIG. 1.

The pseudo random code generator 8, comprises of a bi-phase modulator 10, a sequence generator 12 and a clock pulse generator 14. The sequence generator 12 is arranged to generate a pseudo random logic sequence, of logic 1's and 0's, at a rate determined by the clock period of the clock 14. A segment of a typical logic sequence is illustrated in FIG. 2a. The bi-phase modulator 10 modulates this pseudo random logic sequence to produce a bi-phase encoded sequence. An example of this is illustrated in FIG. 2b, where Manchester Code has been used to produce the encoded sequence.

The position of the switch 4, in coupling any one source 2 to the TWT 6, is controlled by the bi-phase encoded sequence. This sequence ensures that the switch 4, couples each source 2, to the TWT 6 for 50% of the time averaged over a 2 clock cycle period and that no one source 2 remains coupled to the TWT 6 for longer than 1 clock cycle, as illustrated by FIGS. 2c and 2d which show the time periods for which each of the sources 2 are coupled to the TWT 6. If the clock rate is chosen carefully to suit the equipment to be jammed then the amplitude of the jamming signal can be made to look noisy, thereby providing more effective jamming.

Figure 3:
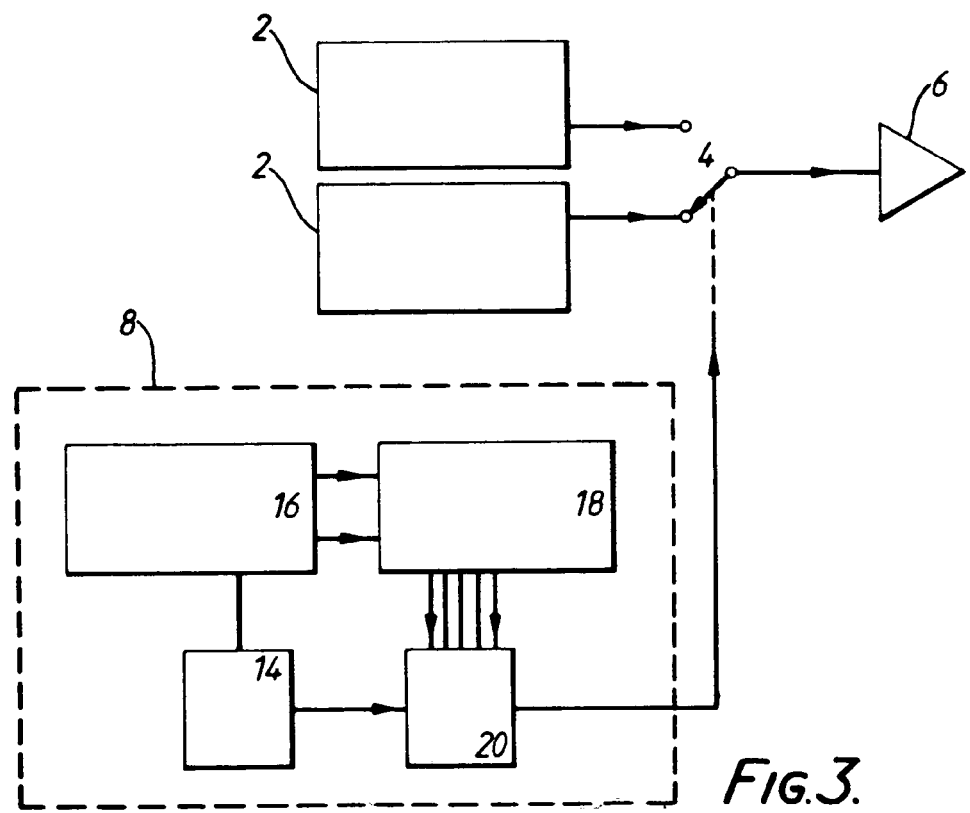
FIG. 3 is a generally schematic block diagram of a time sharing jammer according to a second embodiment of the present invention.

Referring now to FIG. 3, in which like reference numerals have been used to indicate like parts of the time sharing jammer, the pseudo random code generator 8 comprises of an address generator 16 and a read only memory (ROM) 18.

The ROM 18 is addressed by the address generator 16 at a rate determined by the clock period of the clock 14. A parallel serial converter 20 is provided so that the output sequence can be at a higher rate than the address speed of the ROM 18.

The ROM 18 is programmed with a random logic sequence, so as to couple the sources 2 to the TWT 6 in a manner similar to that described with reference to FIGS. 2c and 2d, but whose average is approximately logic ½ over at least a substantial portion of the length of the logic sequence stored in the ROM 18. That is, the number of logic 1's and 0's is roughly equal.

In operation of the time sharing jammer selected parts or all of the random logic sequence stored in the ROM 18 is repeated as required. With existing ROM 18 devices a sequence length of up to about 1 Mega bit can be achieved. Hence, repeating the random logic sequence would not significantly reduce the random characteristic required to provide effective jamming.

Figure 4:
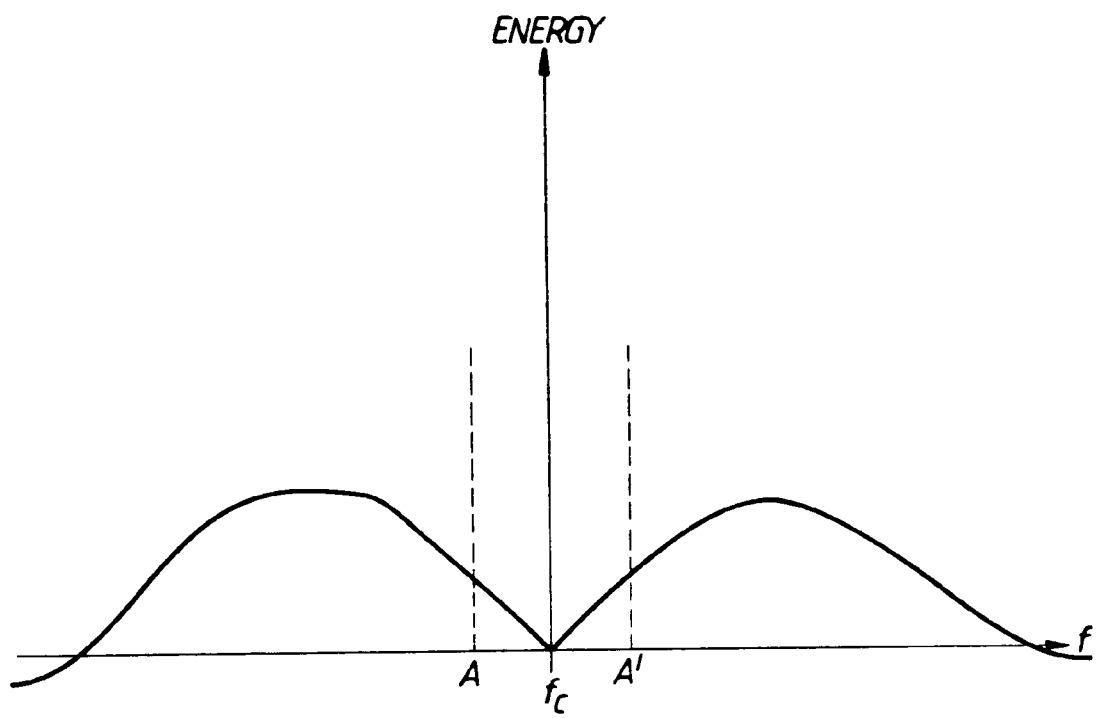
FIG. 4 is a schematic diagram showing the frequency spectrum of a transmitted jamming signal.

FIG. 4 shows a frequency spectrum of a transmitted jamming signal for a source 2 and showing the energy distribution about the carrier frequency of that signal, with a possible bandwidth of a signal source to be jammed illustrated by the lines A and A'.

Figure 5:
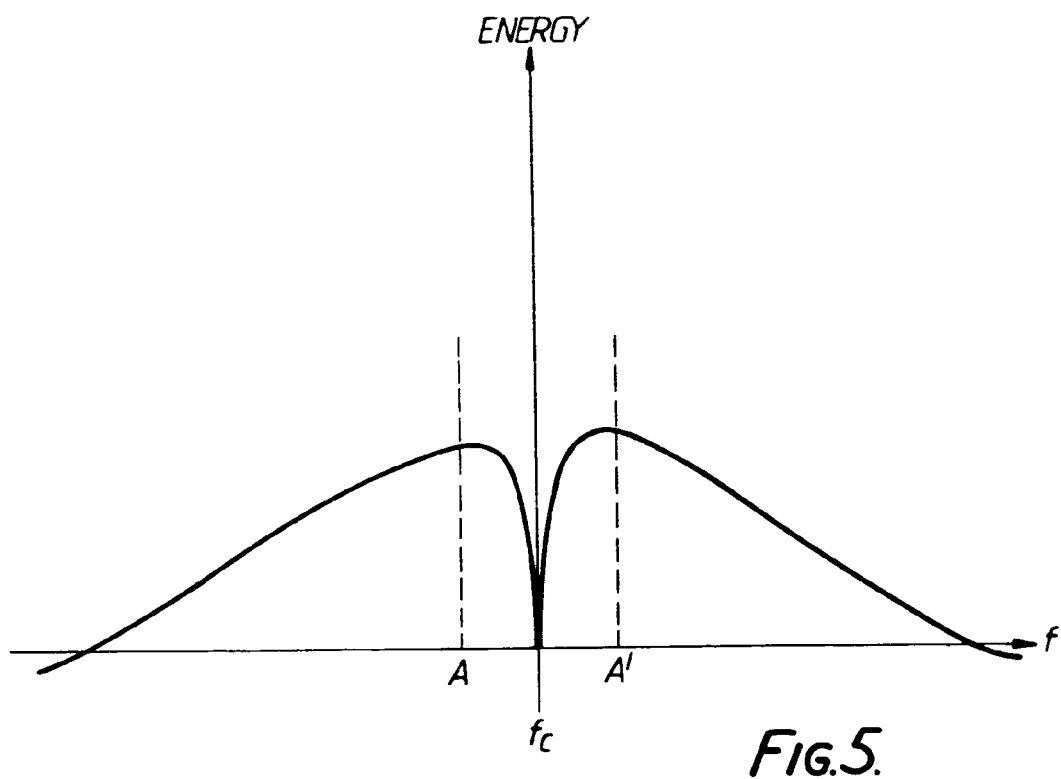
FIG. 5 is a schematic diagram showing the frequency spectrum of jamming signal in which the sideband energy has been concentrated about the carrier frequency of the jamming signal.

The ROM 18 illustrated in FIG. 3 may be programmed to contain a random logic sequence which concentrates more of the sideband energy about the carrier frequency of the jamming signal, as illustrated in FIG. 5. This enables more of the transmitted energy of the TWT 6 to fall within the bandwidth A to A', thus improving the efficiency of the time sharing jammer.

Figure 6:
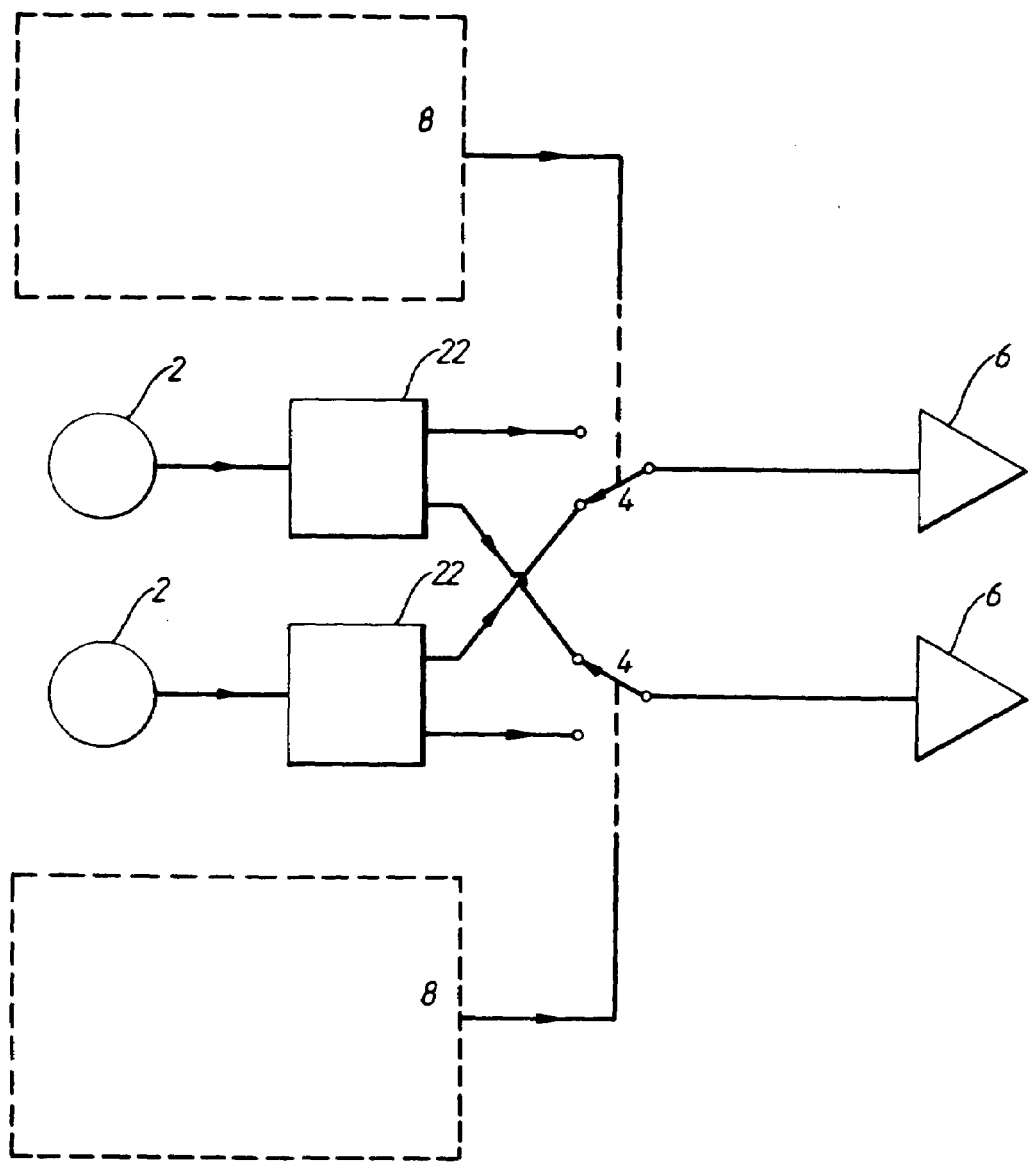
FIG. 6 is a generally schematic block diagram of a time sharing jammer according to a further embodiment of the present invention.

Referring now to FIG. 6 a time sharing jammer includes two sources of jamming signals 2, with each source selectively coupled via a splitter means 22, and a switch 4 to two travelling wave tubes 6. This arrangement utilises what is known in the art as 'combine in space' effect, whereby the interference of two or more jamming signals adds to the disguise of the jamming signals and improves the jamming effectiveness. The position of either switch 4, is being controlled in accordance with the pseudo random code generated by its associated pseudo random code generator 8. This duplicity enables an independent clock rate and an independent pseudo random code to be employed for the control of each switch 4. Such an arrangement substantially reduces the probability of any one of the sources 2 not being coupled to any TWT 6 for a significant part of a clock period thus ensuring that any body, such as an aircraft, on which the time sharing jammer may be located cannot be tracked effectively by the signal source to be jammed.

Although the present invention has been described with respect to specific embodiments it is to be understood that modification may be effected whilst remaining within the scope of the invention. For example, more than one ROM 18 may be provided, each ROM being programmed with a different random code and each ROM being selectively addressed in accordance with a preprogrammed coded sequence, which itself may be stored in a memory device, such as a ROM or a RAM. Furthermore, as future generations of ROM devices are developed, the length of the pseudo random code stored in the ROM can be increased. Also, as the speeds at which ROM devices can be accessed increase, the serial parellel converter may be omitted.

The invention claimed is:

1. A time sharing jammer comprising a plurality of sources of jamming signals, switching means, coupled to the plurality of sources of jamming signals, and to amplifier means for sending the jamming signals to the amplifier means, and a pseudo random code generator for generating a pseudo random bi-phase code arranged to cause operation of the switching means in accordance with the pseudo random bi-phase code and incorporating a clock pulse generator of a given period whereby any one of the plurality of sources of jamming signals is not coupled continuously to the amplifier means for longer than the period of the clock pulse generator.

2. A time sharing jammer according to claim 1 wherein the pseudo random bi-phase code comprises Manchester code.

3. A time sharing jammer according to claim 1 or claim 2 wherein the pseudo random code generator comprises a read only memory encoded with a random code.

4. A time sharing jammer according to claim 3 wherein the pseudo random code generator comprises a parallel serial converter for reducing the address change rate required of the read only memory.

5. A time sharing jammer according to claim 1 comprising at least two switching means for coupling the sources of jamming signals to at least two amplifier means and two or more pseudo random bi-phase code generators arranged to cause operation of the switching means associated with that generator, such that the period and the pseudo random bi-phase code for any pseudo random code generator is independent of the period and the pseudo random code for each of the other pseudo random code generators.

* * * * *